United States Patent [19]
DuBois

[11] Patent Number: 5,068,294
[45] Date of Patent: Nov. 26, 1991

[54] PROCESS TO PRODUCE POLYMERS OF STYRENE DERIVATIVES
[75] Inventor: Donn A. DuBois, Houston, Tex.
[73] Assignee: Shell Oil Company, Houston, Tex.
[21] Appl. No.: 589,363
[22] Filed: Sep. 28, 1990
[51] Int. Cl.$^5$ ............... C08F 2/06; C08F 4/16; C08F 12/08
[52] U.S. Cl. ................ 526/194; 526/65; 526/226; 526/237; 526/332; 526/334
[58] Field of Search ............ 526/194, 237, 65
[56] References Cited

U.S. PATENT DOCUMENTS

| | | | |
|---|---|---|---|
| 2,882,244 | 4/1959 | Milton | 252/455 |
| 3,228,923 | 1/1966 | Scott | 526/194 |
| 3,365,433 | 1/1968 | Manson et al. | 260/91.1 |
| 3,394,116 | 7/1968 | Sorkin | 260/91.1 |
| 3,461,075 | 8/1969 | Manson et al. | 252/301.3 |
| 3,478,007 | 11/1969 | Barkley | 526/77 |
| 3,819,596 | 6/1974 | Gross | 260/91.1 M |
| 4,708,994 | 11/1987 | Wong | 525/392 |
| 4,861,929 | 8/1989 | Miyake | 570/209 |
| 4,866,145 | 11/1989 | Dicker | 526/190 |

FOREIGN PATENT DOCUMENTS

| | | |
|---|---|---|
| 74004055 | 1/1974 | Japan . |
| 096195/13 | 2/1989 | Japan . |
| 1561968 | 3/1980 | United Kingdom . |

OTHER PUBLICATIONS

"Synthesis of Monodisperse Living Poly(vinyl ethers) and Block Copolymers . . . ", Miyamoto et al., Macromolecules, 1984, 17, 2228-2230.
"Living Cationic Polymerization of p-Methoxy Structure . . . ", Higashimura et al., Polymer Bulletin, 19, 7-11, 1988.
"Hydrogen Iodide/Zinc Iodide: A New Initiating System . . . ", Sawamoto et al., Macromolecules, 1987, 20, 2693-2697.
"Synthesis of P-Methoxystyrene-Isobutyl Vinyl Ether Block Copolymers By Living CAtionic . . . ", Higashimura et al., Macromolecules, 1979.
"Mechanism of Living Polymerization of Vinyl Ethers By The Hydrogen Iodide . . . ", Higashimura et al., Macromolecules, 1985, 18, 611-616.

Primary Examiner—Joseph L. Schofer
Assistant Examiner—Fred Zitomer
Attorney, Agent, or Firm—James O. Okorafor

[57] ABSTRACT

A method of preparing styrene derivative polymers is provided. The process utilizes as a catalyst an iodine containing electrophile and a zeolite. The styrene derivatives cationically polymerize to polymers without the need for heavy metal initiators. The styrene derivatives may be copolymerized with vinyl ethers to form random or block copolymers. Preferred styrene derivatives include styrene and methoxystyrenes.

26 Claims, No Drawings

PROCESS TO PRODUCE POLYMERS OF STYRENE DERIVATIVES

FIELD OF THE INVENTION

This invention relates to polymers of stryene derivatives, copolymers of styrene derivatives and vinyl ethers, and to a process to produce these polymers.

BACKGROUND OF THE INVENTION

Polymers of alkoxystyrenes and block copolymers of alkoxystyrenes and vinyl ethers and processes to prepare these polymers by cationic polymerization are known. For example, Higashimura describes a process for polymerizing vinyl ether and para-methoxystyrenes wherein a catalyst obtained by combining HI and $I_2$ or $ZnX_2$ wherein X is a halogen such as iodine, chlorine or bromine is used, Higashimura et al., Macromolecules, Vol. 12, p. 178 (1979). This system is effective in the preparation of these polymers, but the zinc halides are toxic and a process which utilizes a non-toxic catalyst is desirable. The zinc catalysts are also soluble in the polymer solutions and will contaminate the polymer requiring a costly catalyst extraction procedure. Without removing the catalyst the polymer will be highly discolored and the polymer generally has an undersirable color even after catalyst extraction.

The use of zeolites as polymerization catalysts for vinyl ethers is also known. Exemplary processes are described in, for example, U.S. Pat. Nos. 3,228,923; 3,365,433; 3,394,116; 3,461,075; and 3,819,596. Although the mechanism for this polymerization is not clear, it does not appear to be a cationic polymerization. The resultant polymers may have high molecular weights, and have an extremely wide molecular weight distribution. The polymer made by the process of U.S. Pat. No. 3,819,596 is touted as an excellent plasticizer due to the broad molecular weight distribution.

It is therefore an object of this invention to provide a process to polymerize alkoxystyrene wherein a heavy metal cocatalyst is not required. In another aspect it is an object of this invention to provide a process to produce copolymers of alkoxystyrenes and alkenyl ethers wherein a soluble cocatalyst is not required.

SUMMARY OF THE INVENTION

The objects of the present invention are achieved by providing a process to polymerize alkoxystyrenes utilizing an iodine containing electrophile as an initiator and a zeolite as a coinitiator. This initiator system, when utilized under favorable solvent and temperature conditions, can result in polymers with number average molecular weight in the range of about 1,000 to about 1,000,000 and can be utilized to produce copolymers of alkoxystyrenes and vinyl ethers. A preferred iodine containing electrophile is trimethylsilyliodide. Hydrogen iodide may also be utilized as the iodine containing electrophile.

DETAILED DESCRIPTION OF THE INVENTION

The styrene derivatives of this invention include styrene, and substituted styrenes. The aromatic ring of these substituted styrenes enable a sufficiently stable cation to cationically polymerize the styrene derivatives. These styrene derivatives are of the general formula:

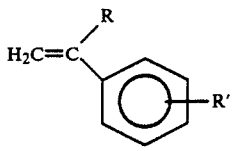

wherein:
R is a hydrogen or an alkyl group, and
R' is a hydrogen, alkyl, or alkyloxy.

A particularly preferred alkoxy substituted styrene is para-methoxystyrene.

The vinyl ether useful in the present invention may be of the general formula:

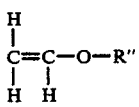

wherein: R" is an alkyl, cycloalkyl or alkyl substituted cycloalkyl, aromatic or alkyl substituted aromatic having from about 1 to about 20 carbon atoms "R" may optionally be substituted with such group as halogen, epoxy, tertiary amine, vinyl, siloxy and the like.

The catalyst useful in the process of the present invention is prepared by combining trimethylsilyliodide, hydrogen iodide or another iodine-containing electrophile with a zeolite to produce an initiator system. It is believed that the two components, along with the monomer, react to form a Lewis acid/base complex with a growing cation that is bound to the zeolite, possibly through an acidic site on either the surface or interior of the zeolite. The cation created by addition of the styrene derivative is represented by:

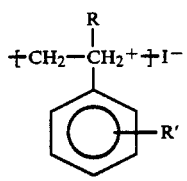

wherein: R and R' are defined above. The cation created by addition of the vinyl ether group is represented by:

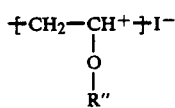

wherein: R" is defined above.

The amount of iodine-containing electrophile utilized is determined by the desired polymer molecular weight. In general, the moles of electrophile provided will be equal to about the grams of monomer divided by the desired weight average polymer molecular weight. This estimation will generally result in an estimate of molecular weight which is 5 to 20 percent of the actual number average molecular weight of the resultant polymer, so generally, 5 to 20 percent more iodide ion containing material will be utilized than that stoichiometrically required to achieve a targeted molecular weight polymer.

Zeolites which have acid sites are effective as the cocatalysts of this invention. Acidity is typically introduced by the decomposition of the NH4+ ion-exchanged form, by hydrogen-ion exchange, or by hydrolysis of zeolite containing multivalent cations during hydrogenation.

A wide variety of acid site containing zeolites may be utilized as the cocatalysts of this invention. These zeolites can include both synthetic and naturally occurring zeolites. Illustrative of the synthetic zeolites are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta, 3,308,069; Zeolite EU-1, 4,537,754; Zeolite ZK-4, 3,314,752; Zeolite ZSM-5, 3,702,886; Zeolite ZSM-11, 3,709,979; Zeolite ZSM-12, 3,832,449; Zeolite ZSM-20, 3,972,983; Zeolite ZSM-35, 4,016,245; Zeolite ZSM-50, 4,640,829; synthetic mordenite; the so-called ultrastable zeolites of U.S. Pat. Nos. 3,293,192 and 3,449,070; and the references cited therein, incorporated herein by reference. Other acceptable synthetic zeolites are described in the book "Zeolite Molecular Sieves-Structure, Chemistry and Use," by Donald W. Breck, 1974, John Wiley & Sons, incorporated by reference herein. Illustrative of the acceptable naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, and yugawaralite. Descriptions of these naturally occurring zeolites are found in the aforementioned book by Breck, and in the book "Molecular Sieves-Principles of Synthesis and Identification", by R. Szostak, Van Nostrand Reinhold, New York, 1989, incorporated herein by reference. These zeolites may be in the hydrogen form or may be partially or fully exchanged with ammonium or metal ions.

The zeolites which are preferred are faujasites, which include synthetic zeolites such as zeolite X and zeolite Y. A zeolite X, which is a crystalline sodium aluminosilicate with pores or channels of approximately 13 Angstrom units in diameter is available commercially as Molecular Sieve 13X. As prepared, the 13X material contains water and has the unit cell formula:

Na$_{86}$(AlO$_2$)$_{86}$(SiO$_2$)$_{106}$·267H$_2$O

The parent zeolite should be dehydrated to make the active catalyst. A synthetic zeolite known as Molecular Sieve 10X is a crystalline aluminosilicate salt having channels above 10 Angstrom units in diameter and in which a substantial proportion of the sodium ions of the 13X material have been replaced by calcium.

The amount of zeolite which is useful for the polymerization of this invention is preferably between about 5 and about 500 grams per gram mole of iodide. This corresponds to about 2 to about 500 parts by weight of monomers for each part by weight of zeolite, and more preferably, about 2 to about 50.

In general, the polymerizations of this invention may be carried out in batch, continuous or semi-continuous operations. The nominal residence time under polymerization conditions will preferably range from about 0.5 to about 10 hours. The reaction is complete after essentially all monomer, i.e., about 95 percent, is converted to polymer, and more preferably 99 percent.

The polymerization reaction of this invention can be accomplished at a temperature within the range of from about −80° to about 200° C. in hydrocarbon, etheral or halogenated hydrocarbon solvents that do not contain acidic hydrogens and which are inert to the reagents used. Temperatures within the range of about −20° to about 25° C. are preferred. Higher temperatures result in wider molecular weight distributions, and lower polymerization temperatures are uneconomical due to refrigeration expense, and result in undesirably slow polymerization rates. The pressure employed is not critical and essentially any pressure may be employed while atmospheric pressure is particularly effective.

Copolymers of vinyl ethers and styrenes may be of block, random, or tapered sequences. Linear block copolymers prepared by sequential monomer additions are preferred. Tapered linear block structures may be prepared by copolymerizing monomers which polymerize at different rates. When styrene derivatives are sequentially polymerized, it is preferred that the vinyl ethers be polymerized first because the ethers tend to polymerize more as ideal living polymers.

The polymers of this invention are useful as interfacial agents, adhesives or in adhesive formulations, lubricating oil, viscosity index improvers, and as rheological modifiers. Block copolymers of vinyl ethers and styrenes are useful as interfacial agents, compatibilizers for polymer blends, adhesives and coatings.

EXAMPLE 1

A homopolymer of p-methoxystyrene is prepared utilizing a TMSI/5A zeolite initiator. A 125 ml flask equipped with a magnetic stirrer and rubber septum was charged with 100 ml of toluene and 3.0 grams of p-methoxystyrene. One gram of 5A zeolite and 0.10 ml of TMSI (about 0.005 moles) were then added. The reaction mixture was stirred and kept at 25° C. for two hours. Samples of the solution were periodically withdrawn and analyzed for p-methoxystyrene to determine the extent of the reaction. More than 99% of the monomer was polymerized after 2 hours of reaction. Gel permeation chromotography (GPC) analysis of the resultant polymer indicated the number average molecular weight of the polymer produced was about 9,000 and the weight average molecular weight was about 79,000.

This example demonstrates that the TMSI/5A zeolite initiation system effectively polymerizes styrene derivatives.

EXAMPLE 2

A homopolymer of p-methoxystyrene is prepared utilizing a TMSI/13X zeolite initiator. The procedure of Example 1 was repeated substituting one gram of 13X zeolite for the one gram of 5A zeolite. Greater than 99 percent of the monomer present was polymerized after 1.5 hours. The resultant polymer had a number average molecular weight of 11,000 and a weight average molecular weight of 112,000.

This example demonstrates that the TMSI/13X zeolite initiation systems effectively polymerizes styrene derivatives.

I claim:

1. A process for producing a polymer comprising the step of contacting a monomer selected from the group of styrene and styrene derivatives with a zeolite and an iodine containing electrophile under conditions which result in polymerizing the monomers.

2. The process of claim 1 wherein the styrene or styrene derivative, zeolite and iodine containing electrophile are contacted in an insert solvent, in the absence of a heavy metal co-catalyst.

3. The process of claim 2 wherein the inert solvent is selected from the group consisting of hydrocarbons, halogenated hydrocarbons, ethers and mixtures thereof.

4. The process of claim 1 wherein the weight ratio of monomers to zeolite is from about 2 to about 50.

5. The process of claim 1 wherein the ratio of iodine containing electrophile to monomer is from about 1 millimole to about 0.001 millimole per gram of monomer.

6. The process of claim 1 wherein the monomer is of the formula

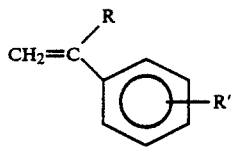

wherein R is selected from the group consisting of an alkyl or a hydrogen and R' is selected from the group consisting of hydrogen, alkyl and alkoxy groups.

7. The process of claim 6 wherein the monomer is styrene.

8. The process of claim 6 wherein R is a hydrogen and R' is an alkoxy group.

9. The process of claim 6 wherein monomer is p-methoxystyrene.

10. The process of claim 1 wherein the acidic zeolite is selected from the group consisting of zeolite X and zeolite Y.

11. The process of claim 1 wherein the zeolite is a faujasite.

12. The process of claim 1 wherein the zeolite is 13X zeolite.

13. The process of claim 1 wherein the polymer produced has a number average molecular weight between about 1,000 and about 1,000,000.

14. The process of claim 1 wherein the iodine containing electrophile is trimethylsilyliodide.

15. The process of claim 11 wherein the iodine containing electrophile is trimethylsilyliodide.

16. The process of claim 15 wherein the monomer is a methoxystyrene.

17. The process of claim 1 wherein the iodine containing electrophile is hydrogen iodide.

18. The process of claim 11 wherein the iodine containing electrophile is hydrogen iodide.

19. The process of claim 18 wherein the monomer is a methoxy styrene.

20. A process to produce a copolymer of a vinyl ether monomer and a comonomer selected from the group consisting of styrene, alkyl substituted styrene, and alkoxy substituted styrenes, the process comprising the steps of:
   a) contacting the monomer and the comonomer with an initiator system comprising a zeolite and an iodine containing electrophile; and
   b) recovering a copolymer of the monomer and comonomer.

21. The process of claim 20 wherein the monomer and the comonomer are sequentially contacted with the initiator system, in the absence of a heavy metal co-catalyst.

22. The process of claim 21 wherein the copolymer recovered is a block copolymer.

23. The process of claim 20 wherein the initiator, monomer and comonomer are contacted in an inert solvent.

24. The process of claim 20 wherein the weight ratio of monomer plus comonomer to zeolite is from about 2 to about 50.

25. The process of claim 20 wherein the ratio of monomer plus comonomer to iodine containing electrophile is from about 10 to about 1,000 to about 100,000 grams per gram mole of iodide.

26. The process of claim 20 wherein the comonomer is methoxy styrene.

* * * * *